United States Patent [19]
Spengler

[11] Patent Number: 6,136,415
[45] Date of Patent: Oct. 24, 2000

[54] VEHICLE INTERIOR TRIM PANEL WITH A SOFT-TOUCH FOAM LAYER, AND A METHOD AND APPARATUS FOR MAKING THE SAME

[75] Inventor: Gerhard Spengler, Frankfurt, Germany

[73] Assignee: R + S Technik GmbH, Offenbach, Germany

[21] Appl. No.: 09/065,750

[22] Filed: Apr. 24, 1998

Related U.S. Application Data

[60] Provisional application No. 60/071,962, Jan. 20, 1998.

[30] Foreign Application Priority Data

May 27, 1997 [DE] Germany ............................ 197 22 083

[51] Int. Cl.⁷ .............................. B32B 5/18; B32B 27/00; B32B 5/20
[52] U.S. Cl. .......................... 428/157; 428/158; 428/159; 428/172; 428/318.6; 428/319.9; 195/196; 195/78; 195/79; 195/309.9; 264/46.6
[58] Field of Search ..................................... 428/157, 158, 428/159, 172, 318.6, 319.9; 156/196, 78, 79, 309.9; 264/46.6

[56] References Cited

U.S. PATENT DOCUMENTS

| | | |
|---|---|---|
| 2,797,179 | 6/1957 | Reynolds et al. . |
| 4,328,067 | 5/1982 | Cesano . |
| 4,824,714 | 4/1989 | Gest . |
| 5,474,841 | 12/1995 | Matsuki et al. . |
| 5,709,925 | 1/1998 | Spengler et al. . |
| 5,756,189 | 5/1998 | Nagano et al. . |

FOREIGN PATENT DOCUMENTS

| | | |
|---|---|---|
| 0686476 | 12/1995 | European Pat. Off. . |
| 2022510 | 12/1979 | United Kingdom . |
| WO99 16657 | 4/1999 | WIPO . |

*Primary Examiner*—Jerry D. Johnson
*Attorney, Agent, or Firm*—W. F. Fasse; W. G. Fasse

[57] ABSTRACT

An interior trim component such as a vehicle dashboard includes a substantially rigid and form-stable substrate of polypropylene and natural fibers, a supporting halo skeleton and other frame components heat fused onto the backside of the substrate, and a polyolefin foam layer as well as a decorative polyolefin cover film laminated onto the front side of the substrate. The foam layer has an increased thickness and a decreased foam density at sharply contoured or curved areas of the trim component, in comparison to the flat surfacial areas. As a result, the trim component has a desirable soft-touch characteristic and impact absorbing properties at all areas including protruding curves and edges. A method for forming such a trim component involves steps of pre-molding the foam layer and cover film by vacuum thermoforming, pre-molding the substrate by vacuum thermoforming, and then heat laminating the pre-heated, pre-molded substrate onto the pre-molded foam layer and cover film. The sharply curved or contoured areas of the component are provided with a greater tolerance spacing between the substrate and the cover film, which are held to the respective mold contours by vacuum. Under the effect of heat and the applied vacuum, the foam layer expands to have a greater thickness and a lower density in these sharply contoured areas.

38 Claims, 12 Drawing Sheets

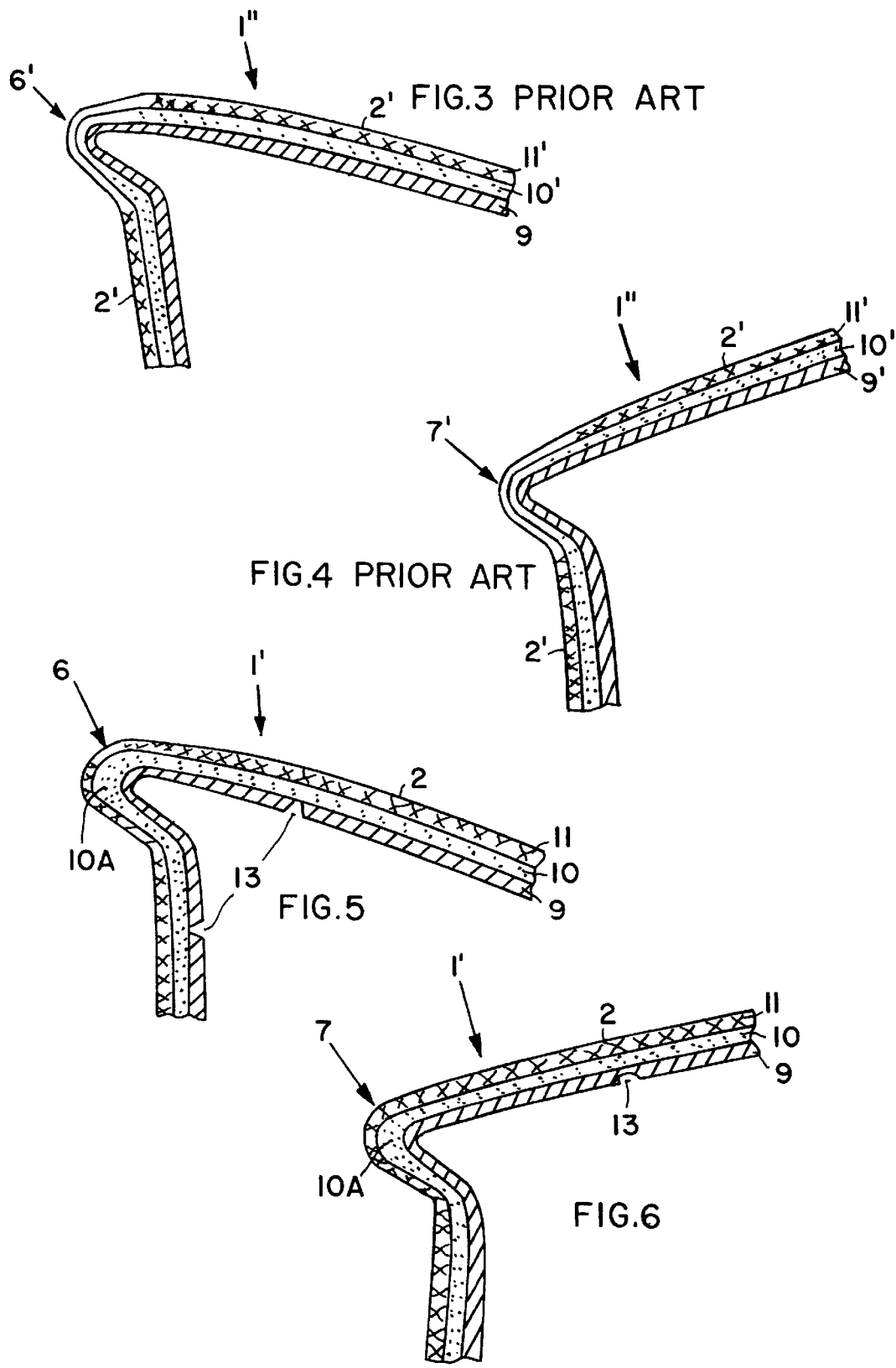

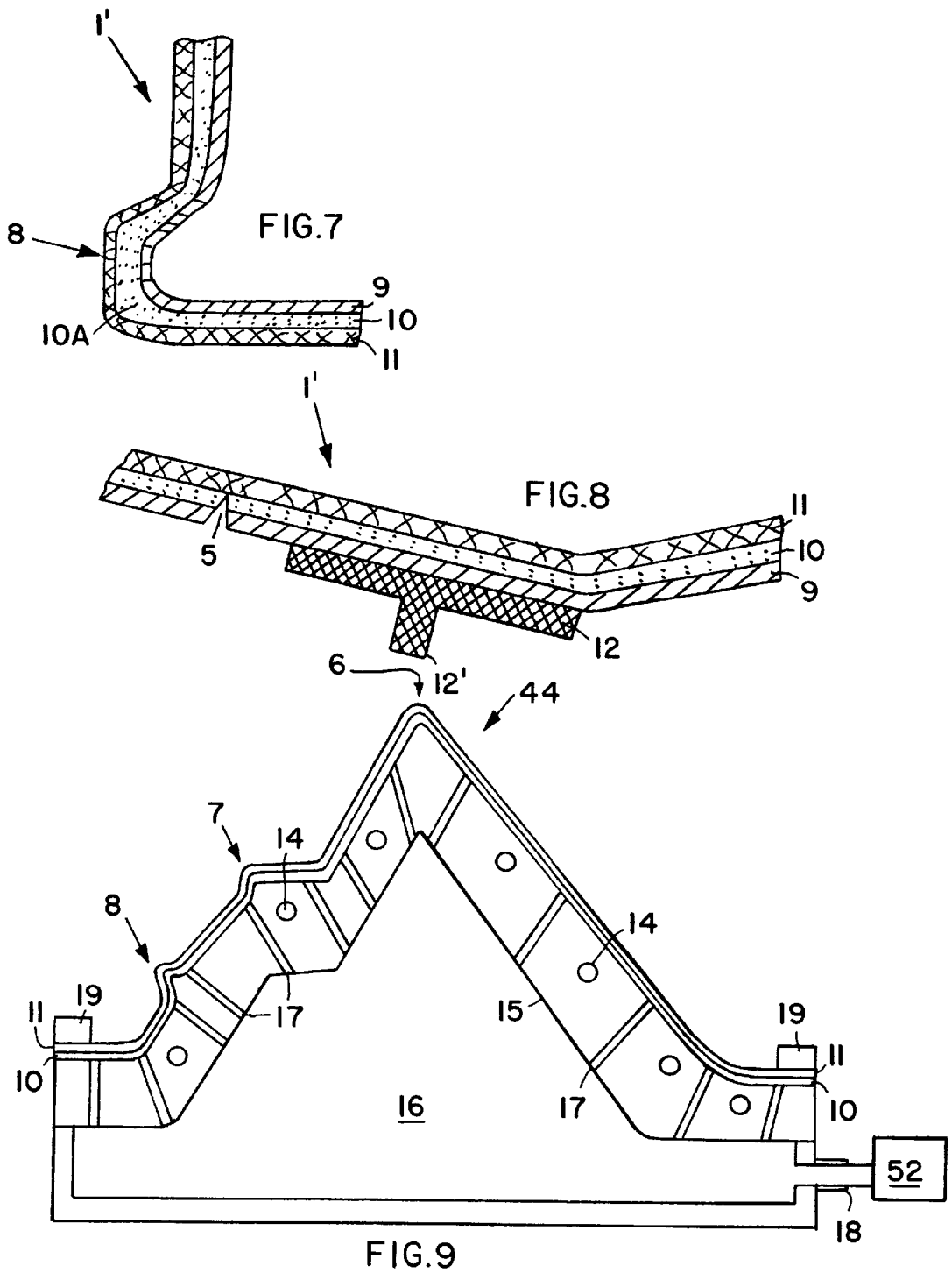

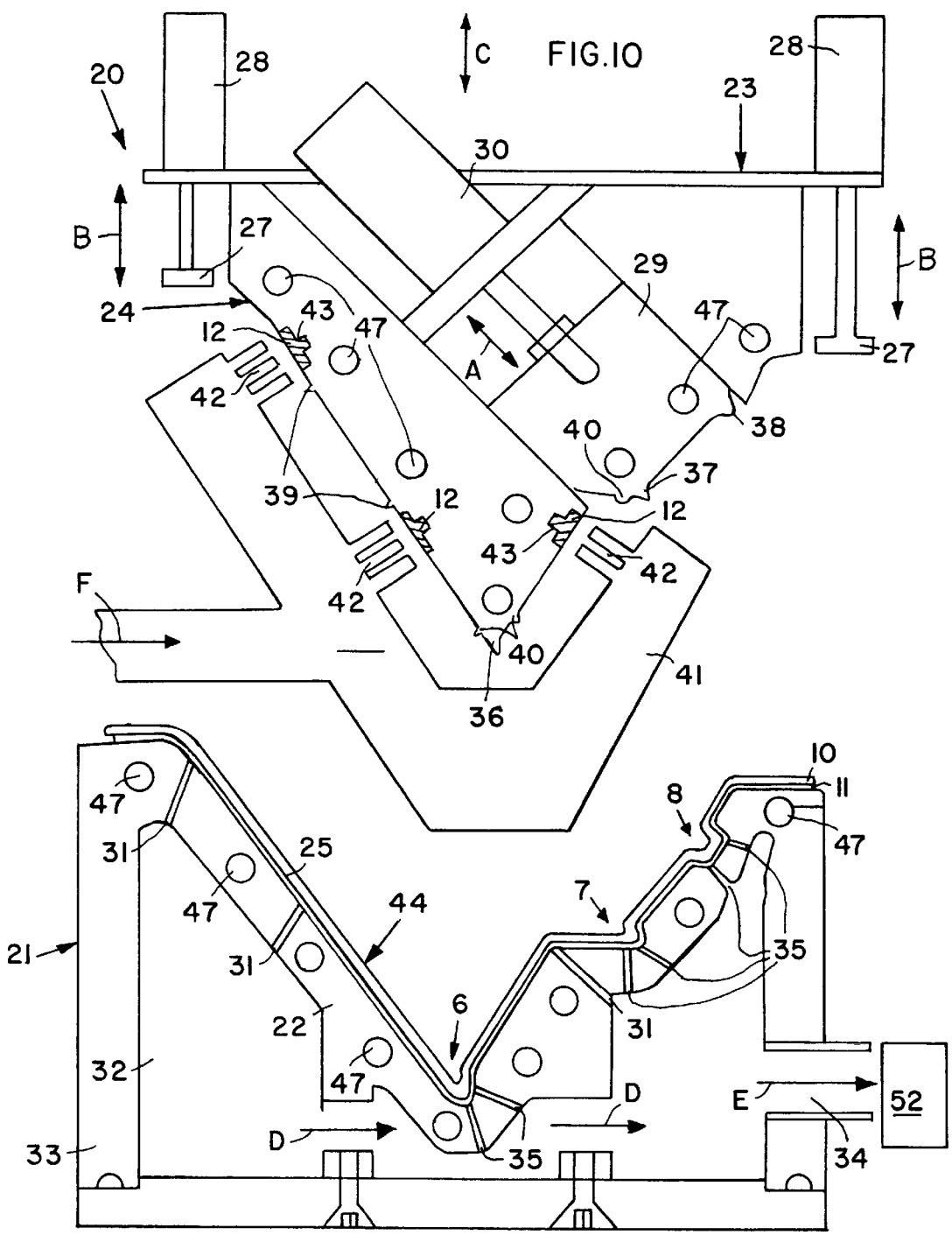

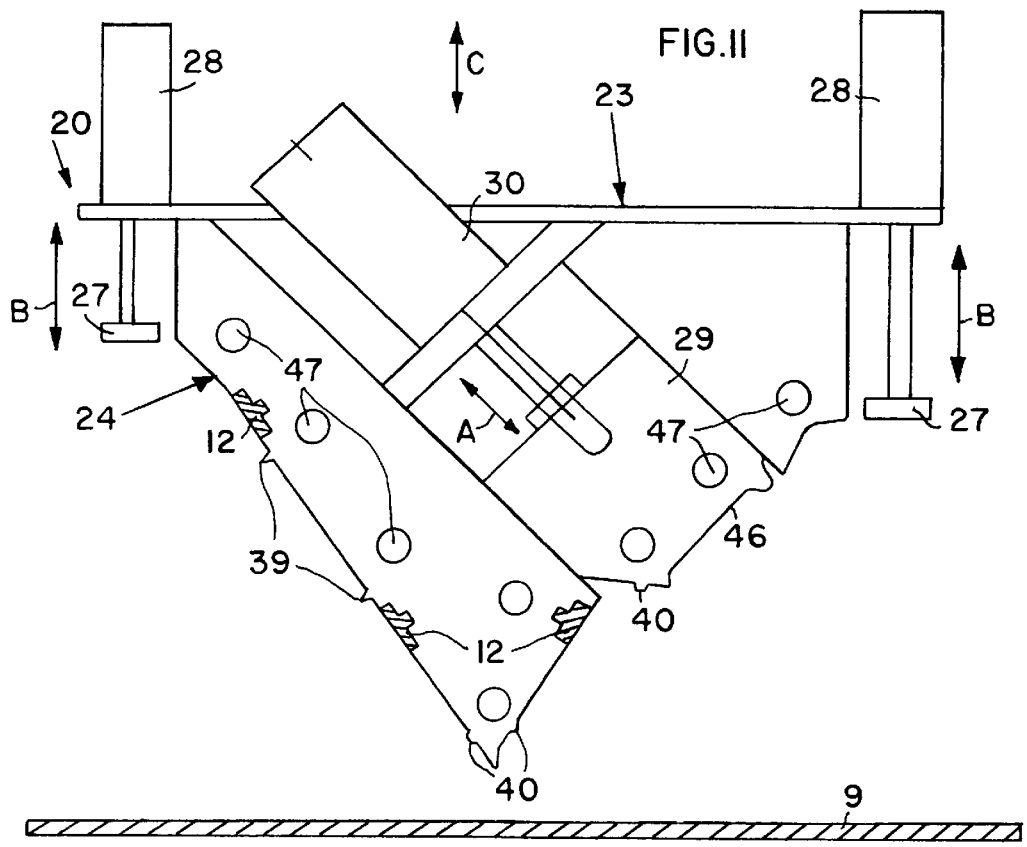
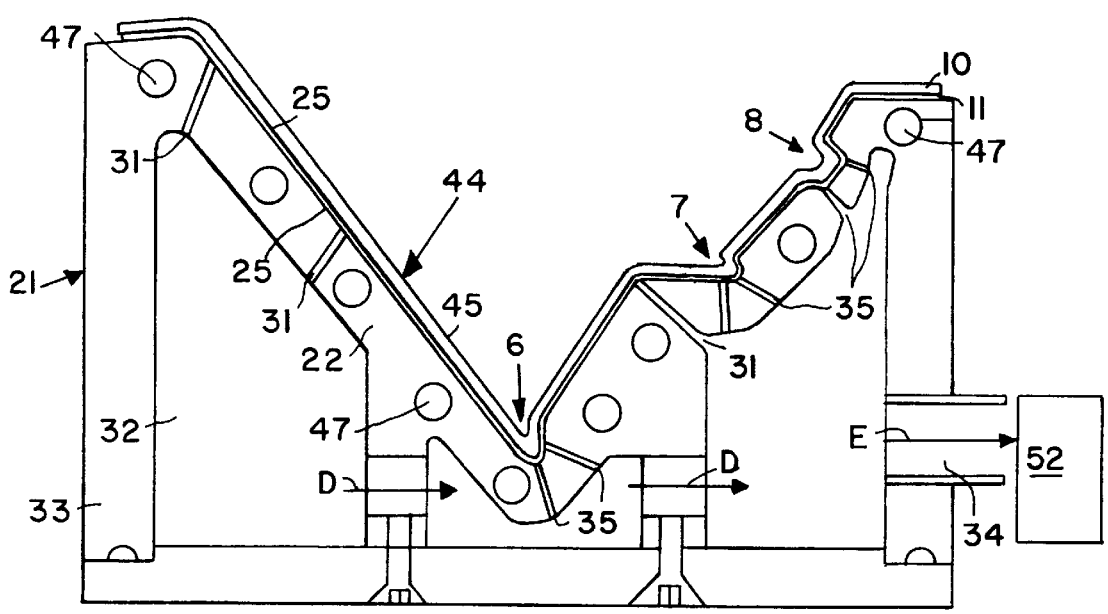
FIG.11

FIG.18
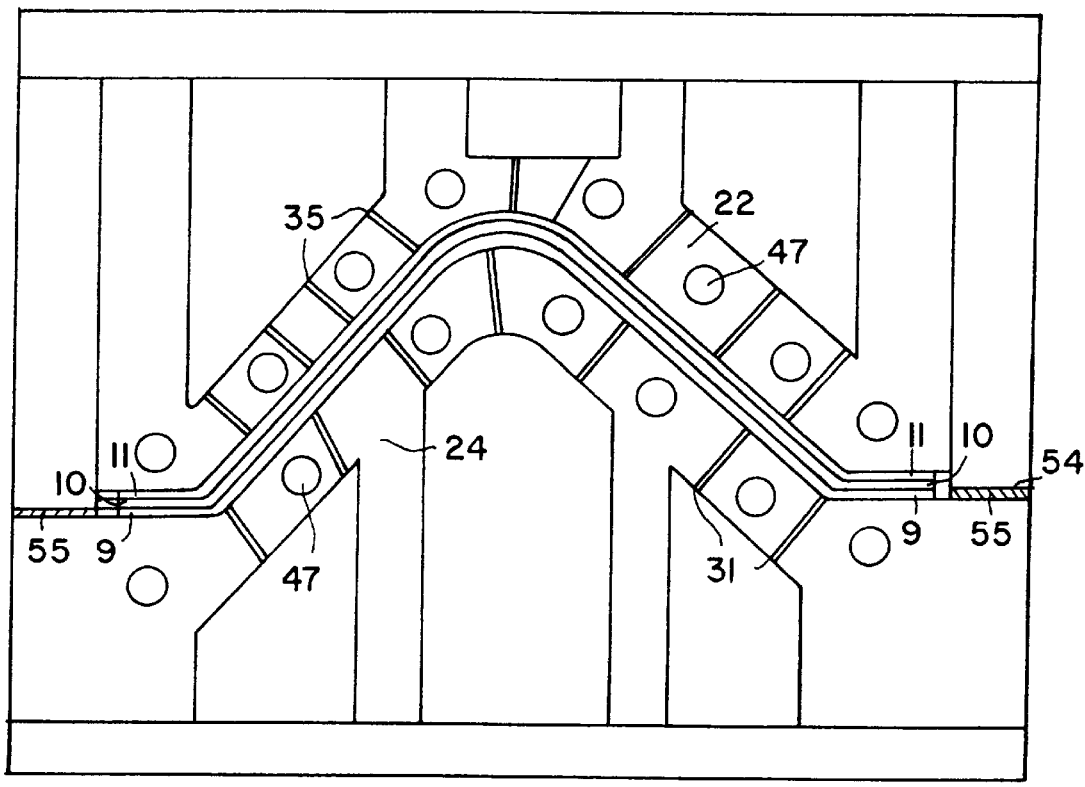
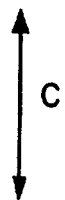
C

VEHICLE INTERIOR TRIM PANEL WITH A SOFT-TOUCH FOAM LAYER, AND A METHOD AND APPARATUS FOR MAKING THE SAME

CROSS-REFERENCE TO RELATED APPLICATION

This application is related to and claims the benefit of copending U.S. Provisional Application Ser. No. 60/071,962 filed Jan. 20, 1998.

FIELD OF THE INVENTION

The invention relates to a trim component such as a trim panel or a dashboard for the interior of an automobile or other vehicle, having a foam layer that provides a "soft-touch" characteristic. The invention further relates to a method and an apparatus for making such a trim component.

BACKGROUND INFORMATION

Interior trim components of the above mentioned general type, such as door trim panels and dashboards for automobiles, as well as methods and apparatus for forming such trim components are generally known in the art. However, the known products, methods and apparatus all suffer disadvantages, which the industry has long felt a need to overcome or improve upon. The automobile industry has come to require a "soft-touch" characteristic for high quality trim components. In other words, the surface of the trim components must feel soft or resilient, and not hard or rigid, to the touch. This requirement arises from impact protection considerations, and even more simply from consumer preferences. In order to provide such a soft-touch characteristic, known trim components typically comprise a form-stable substrate, a soft foam layer that provides the "soft-touch", and a decorative cover film that will form the exposed surface of the trim component. There are several known methods for forming such multi-layered laminated or composite trim panels.

A first widely employed method involves forming the cover film of a polyvinylchloride material for example, forming the substrate of a synthetic plastic material such as ABS plastic or polypropylene, and then back-foaming a polyurethane foam onto the backside of the decorative cover film, i.e. between the cover film and the plastic substrate. After the polyurethane foam injection step, the three-layered, formed material is cut into the required final shape. The product resulting from this foam injection or back-foaming method includes a polyurethane foam layer that has a substantially uniform foam density, and that can have a substantially uniform thickness over the entire trim component if desired, so that the trim component has a soft-touch characteristic and an impact energy absorbing characteristic over its entire surface, including over the edges or corners thereof.

The back-foaming method, however, suffers distinct disadvantages. Most importantly, the back-foaming or foam injection step requires significantly longer and even a multiple of the time required for carrying out the other product forming steps in the total product forming cycle. Thus, the foaming step is a production bottleneck. Furthermore, the foaming equipment and materials require a relatively high capital and material investment. Also, the finished products comprise a mixture of different synthetic materials firmly bonded together, and thus these products cannot be easily broken down and recycled.

According to another known method, a cover sheet including a cover film and a foam layer is laminated, using an interposed adhesive layer, onto a pre-formed wood fiber or synthetic plastic substrate. The cover film and foam layer are molded or formed onto the pre-formed substrate using heat and pressure in a molding apparatus. Due to the adhesive layer, it has been found that the cover film and foam layer can slip or shift and thus cause wrinkling or bunching of the cover sheet when the molding lamination is carried out. Furthermore, the cover film and the foam layer are necessarily pulled and stretched to a greater extent, and thus caused to become thinner, at areas of the pre-formed substrate having sharply curved edges or corners. Thus, in the finished product, the cover film and foam layer are substantially thinner in the areas of sharp radius edges and corners as well as protruding areas or deeply recessed areas than in the flat surface areas of the trim component. As a consequence, the corners, edges and strongly contoured portions of the trim component do not provide an adequate soft-touch characteristic, i.e. these areas feel relatively hard or rigid to the touch.

It is also known to laminate and mold the trim component in a so-called one-shot method, in which the substrate, the foam layer, and the cover film are initially provided as webs of material having a substantially constant thickness or cross-section, and are then laminated together and formed or molded in three-dimensions in a single molding operation. Disadvantageously in this method, the foam layer and the cover film are heated to a relatively high molding temperature and therefore become soft and deformable during the laminating and molding process. As a result, the cover film and foam layer are significantly thinned at all of the corners, edges, sharply curved radii and strongly contoured areas of the trim component. Similarly, the substrate itself is thinned due to the molding process at these areas. Consequently, the substrate, the foam layer, and the cover film are all thinner and harder at the corners, edges and sharply curved radii of the finished product. While an adequate soft-touch effect can be achieved on the flat surface areas, it cannot be achieved at the corners, edges and sharply contoured areas. The fiber structure or grain character of the substrate may even show through the surface of the thinned cover film in these areas.

It is also known to use injection molded synthetic material substrates for standard automobile dashboards and other trim components. A cover film is simply glued or laminated onto the previously injection-molded substrate. A disadvantage of such trim components is that they are hard and do not offer the desired soft-touch characteristic, and furthermore, such trim components can shatter or splinter rather than absorbing energy in impact situations.

SUMMARY OF THE INVENTION

In view of the above, it is an aim of the invention to provide an interior trim component that includes a cover film and a foam layer laminated onto a substrate in such a manner that the soft-touch characteristic is maintained or enhanced at corners and edges and other sharply contoured areas of the trim component. It is a further object of the invention to provide such a trim component that avoids the use of adhesives, minimizes the different types or numbers of materials that are used, and uses environmentally friendly and recyclable materials. The invention further aims to provide a method and apparatus for manufacturing such a trim component, to overcome or avoid the further disadvantages of the prior art, and to achieve additional advantages, as are apparent from the present description.

The above objects have been achieved according to the invention, in a trim component contoured in at least two dimensions, comprising a form-stable substrate, a cover film, and a foam layer between the substrate and the cover film, wherein the trim component includes a relatively less contoured surfacial area and a relatively more sharply or strongly contoured curved area, and wherein the foam layer has at least one of a reduced density and an increased thickness at the curved area relative to the surfacial area. Preferably, the foam layer has a reduced density and an increased thickness at the more strongly contoured curved area relative to the flatter surfacial areas.

The above objects have further been achieved by the method according to the invention, including the following steps:

a) heating a first sheet comprising a foam layer and a cover film;
b) pre-molding the heated first sheet into a configuration that is contoured in at least two dimensions, and then cooling the pre-molded first sheet;
c) supporting the pre-molded first sheet on a negative final mold member, with the cover film in contact with a negative mold surface of the negative final mold member;
d) heating a second sheet comprising a substrate material;
e) laminating the heated second sheet onto the pre-molded first sheet supported on the negative final mold member by pushing the heated second sheet against the foam layer of the pre-molded first sheet using a positive final mold member, to form a molded laminated product; and
f) cooling the molded laminated product.

Preferably, the pre-molding and the final molding are carried out while applying a vacuum through the respective mold surfaces, and further the substrate sheet is also vacuum pre-molded before the laminating and final molding step. The final molding and laminating is carried out such that the foam layer is expanded to a greater thickness and a lesser density at the more strongly contoured curved areas. Another general method of the invention thus calls for heat laminating a previously produced sheet of soft foam onto a substrate, between the substrate and a cover film, and expanding the sheet of soft foam to a differing extent in different areas so as to fill out differing spacing distances between the substrate and the cover film in those different areas.

The invention further provides an apparatus for molding and laminating a laminated component including a substrate and a cover sheet. The apparatus comprises a final molding and laminating station including a positive mold member, a negative mold member, a clamp frame adapted and arranged to hold the substrate between the positive mold member and the negative mold member, and at least one vacuum source, wherein the positive and negative mold members are arranged to be relatively movable toward and away from one another, wherein the negative mold member includes a first vacuum plenum therein and first vacuum passages extending from the first vacuum plenum and opening in a negative mold surface thereof, and wherein the first vacuum plenum is connected to the at least one vacuum source. The apparatus preferably further comprises a pre-molding station including a positive pre-molding mold member having a second vacuum plenum therein and second vacuum passages extending from the second vacuum plenum and opening in a positive mold surface of the positive pre-molding mold member, wherein the second vacuum plenum is connected to the at least one vacuum source.

According to the invention, the foam layer is not thinned or compressed in the areas of an edge or corner of the finished trim component. More particularly, the foam layer in the finished trim component has a lower density in the areas of the corners, edges and other sharply contoured areas. This is achieved by the method and apparatus according to the invention, in contrast to the prior art as discussed above. Namely, in the prior art methods involving molding and lamination of a foam sheet, the foam sheet necessarily became thinned, compressed, or even totally collapsed at sharply contoured areas, because the cover film and foam layer were heated, stretched, and compressed over the sharply contoured areas of the substrate in a molding apparatus. The present invention avoids this effect and the resulting loss of the soft-touch character at the sharply contoured areas, by providing a special molding method and apparatus that allow the initial thickness, density and cell structure of the foam layer to be maintained or even enhanced by the expansion of the foam layer during the molding process.

Due to such expansion of the foam layer, the foam layer will have a lower density at the sharply contoured corners, edges and other areas, and the soft-touch characteristic in these areas will be equal to or even better than the soft-touch characteristic on the large surface areas of the trim component.

To achieve this effect, the invention provides that the cover film and foam layer are pre-molded by vacuum forming on a cooled positive mold (i.e. a mold having substantially the outer contour of the finished part), with the outer surface of the cover film facing away from the mold, at a temperature just sufficient for pre-molding or preforming the cover film and foam layer. In this manner, the invention avoids the need of forming and molding the cover film and foam layer together with the hot substrate as in the prior art. Pre-molding the cover film and foam layer on a positive or male mold, with the foam facing the mold, protects the decorative surface finish of the cover film, such as an artificial leather grain or a decorative embossed pattern.

Alternatively, it is possible to pre-form the foam layer and cover film into a female negative mold, with the cover film facing the mold surface. According to this embodiment, all molding steps can be carried out in a single molding station or apparatus, using one set of a positive mold and a negative mold, as will be described in detail below. However, in this case, the mold surface of the female negative mold must be cooled to avoid damaging or deforming the surface of the decorative cover film, or must have a surface finish corresponding to the desired finish grain or pattern of the decorative cover film, so as to emboss this finish grain or pattern onto the film. Otherwise, the grain previously provided on the film would be crushed. Preferably, only the foam layer is heated from the foam side, while the cover film is cooled or temperature stabilized to a temperature that is low enough to avoid damaging the cover film. Also, in any event, sufficient time must be allowed for the cover film and foam layer to cool sufficiently after the pre-molding, to avoid softening and crushing the foam layer when the hot substrate is laminated into place in the subsequent laminating operation.

If the pre-molding was carried out on a positive or male mold, next according to the invention, the pre-formed cover film and foam layer are laid into a negative mold (i.e. a mold having substantially the inverse of the outer contour of the finished part) and held in place by vacuum, and the heated substrate sheet is laminated onto the pre-formed foam layer plus cover film. If the substrate sheet is initially a flat sheet that is pushed by the male mold into and against the pre-formed foam layer and cover film that are held by vacuum in the female mold, then areas that are steeply contoured relative to the mold advancing direction may suffer a dragging friction of the substrate sheet against the foam layer before the substrate reaches its final lamination position. As a result, the foam and cover film may be pulled or wrinkled in such areas. Therefore, the preferred embodiment of the method further comprises vacuum pre-molding the heated substrate sheet itself onto the male mold to overcome the above mentioned possible difficulty. In the preferred embodiment, the pre-formed substrate is only contacted and pressed against the pre-formed foam layer at the last moment of the molding process, substantially uniformly over all areas, and substantially with only perpendicular pressing forces, whereby the lateral slipping friction of the substrate against the foam layer is substantially avoided. The preferred embodiment also helps to achieve the overall goal that most of the forming of both the foam and cover film as well as the substrate is carried out by laying the respective materials over the gross contours of the mold, while only the detail contour areas are formed by molding and stretching the materials. In this manner, over-thinning of the materials can further be avoided.

Thus, according to the invention, the substrate and the cover film plus foam layer are both pre-molded or formed independently of each other, and are then held in place by vacuum to avoid thinning deformation and wrinkling of the foam layer and cover film as occurred in the prior art methods involving molding or forming of the cover film foam layer and substrate together. The hot pre-formed substrate is heat laminated onto the pre-formed foam layer plus cover film, while vacuum is maintained on the substrate and on the cover film. As a result, the respective contours of the substrate and the cover film are positively held to the desired contours of the mold surfaces, and the cover film is not thinned and collapsed toward the substrate over the corners, edges and sharply contoured areas.

The heat from the substrate causes the foam layer to soften slightly, and expand to fill the tolerance or void between the substrate and cover film at the corners, edges and sharply contoured areas. The respective female and male mold surfaces at the corners, edges and sharply contoured areas must simply be properly contoured and dimensioned to provide the desired degree of space or tolerance which the foam layer will fill by expanding. Typically used polyolefin foams will expand up to about 25% in volume, i.e. will expand to a density of 25% less, when heated to the molding temperatures of the substrate around 200° C.

It is also possible to tailor the foam composition to achieve the desired degree of expansion during the molding process. Namely, it is possible to add a blowing agent to the foam composition while the foam is being manufactured, whereby the blowing agent is selected to cause a blowing expansion of the foam once a predetermined threshold temperature, such as 200° C. for example, is exceeded during the molding process. In this manner, the precise degree of foam expansion required in any situation, for example in the range of 10 to 30%, can be achieved by proper compounding of the foam material and by controlling the temperature to which the foam will be subjected during the final molding process.

The expansion effect is further enhanced by the vacuum applied to the molds, and especially the vacuum applied to the male or positive mold, because this vacuum is effective directly on the foam layer through the preferably air permeable substrate. The use of an air permeable substrate achieves the following additional advantage. When the substrate is brought into contact with the foam layer during the final lamination, air can be trapped therebetween, to cause air pockets sandwiched or entrapped within the final laminated material. In the prior art, it was necessary to perforate the cover film so as to allow such air pockets to escape. According to the present invention, the air pockets are sucked out by the vacuum applied through the upper male mold and thus through the air permeable substrate, so there is no need to provide perforations in the cover film.

After the lamination molding, the component is removed from the mold and allowed to cool, whereby the foam layer becomes fixed or permanently set in its molded configuration. Namely, the curved or contoured areas with a greater tolerance between the substrate mold and the cover film mold will have a permanently set lower foam density while the general surface areas of the component will have a permanently set higher foam density.

A halo skeleton frame or instrument mounting frame or other reinforcing components made of polyolefin may be bonded onto the back surface of the substrate during the lamination process. Such frame components stiffen and strengthen the overall trim component and provide structurally sound mounting locations for auxiliary equipment such as instruments, air vents and ducts, and the like, and may be pre-formed components, for example injection molded polyolefin components, having rivet pegs protruding therefrom for later thermal riveting attachment of the auxiliary devices. In the method of the invention, the frame components are secured to the upper male mold by vacuum or mechanical clips before the molding and lamination process. The bonding surface of each plastic frame component is set flush with the surface of the mold member. A heater such as a hot air blower operating at approximately 450 to 500° C. is used to heat the plastic frame members on the bonding surface thereof. When the heated fibrous substrate mat is brought into position, pre-formed against the upper male mold, and then laminated onto the foam layer, the plastic frame members are heat bonded surfacially onto the backside of the substrate, without leaving any stamping imprints or marks on the fibrous substrate, the foam or the cover film.

Due to its advantageous expansion, the foam layer is preferably a polyolefin foam. A polypropylene and/or polyethylene foam is particularly preferred, because such foams will readily adhere to polyolefin cover films and to polyolefin material contained in the substrate, under the effect of temperature and pressure, i.e. by thermal fusion bonding. The substrate preferably comprises environmentally friendly natural fibers in combination with a polyolefin material such as polypropylene. Such a substrate provides the desired air permeability, and good thermal bonding to the foam layer and to a halo skeleton frame or instrument mounting frames or clips, which are also made of a polyolefin material. By these means, the use of adhesives can be avoided, and the entire trim component is based on polyolefin and natural fiber materials. As such, the entire trim component can easily be recycled for reuse of the materials or as a combustion fuel source.

Furthermore, a dashboard or other trim component may be composed of several sections or segments that are individually manufactured according to the present invention, and then thermally welded together along the halo skeleton support frame in order to prepare the finished part. In this manner, a modular design and construction, and thus a flexible configuration of parts can be achieved without having to retool the manufacturing equipment. Also, different substrate materials can be used for different sections or segments of the part, to provide different physical properties as needed in different areas. For example, a substrate containing natural fibers can be used on the upper portion of a dashboard to provide impact energy absorption, while the bottom side of the dashboard may use a plastic substrate.

BRIEF DESCRIPTION OF THE DRAWINGS

In order that the invention may be clearly understood, it will now be described, in connection with an example embodiment of the invention with reference to the drawings, wherein:

FIG. 3 is an enlarged sectional view of the detail area III shown in FIG. 2, but showing a dashboard construction according to the prior art;

FIG. 4 is an enlarged sectional view of the detail area IV in FIG. 2, but showing a dashboard construction according to the prior art;

FIG. 5 is an enlarged sectional view showing the detail area III of FIG. 2 in the dashboard construction according to the invention;

FIG. 6 is an enlarged sectional view showing the detail area IV of FIG. 2 in the dashboard construction according to the invention;

FIG. 7 is an enlarged sectional view of the detail area VII in FIG. 2 in the dashboard construction according to the invention;

FIG. 8 is an enlarged sectional view of the detail area VIII in FIG. 2 in the dashboard construction according to the invention;

FIG. 9 is a schematic sectional view of a positive male mold for pre-molding the foam layer and cover film according to the invention;

FIG. 10 is a schematic sectional view of a molding station or apparatus for carrying out the final molding and lamination of a trim component according to the invention;

FIG. 11 is a sectional view showing the apparatus of FIG. 10 in a subsequent operating step;

FIG. 18 is a schematic sectional view of the molding apparatus of FIG. 17, shown in a stage of carrying out the final molding.

DETAILED DESCRIPTION OF PREFERRED EXAMPLE EMBODIMENTS AND OF THE BEST MODE OF THE INVENTION

Figure 1:
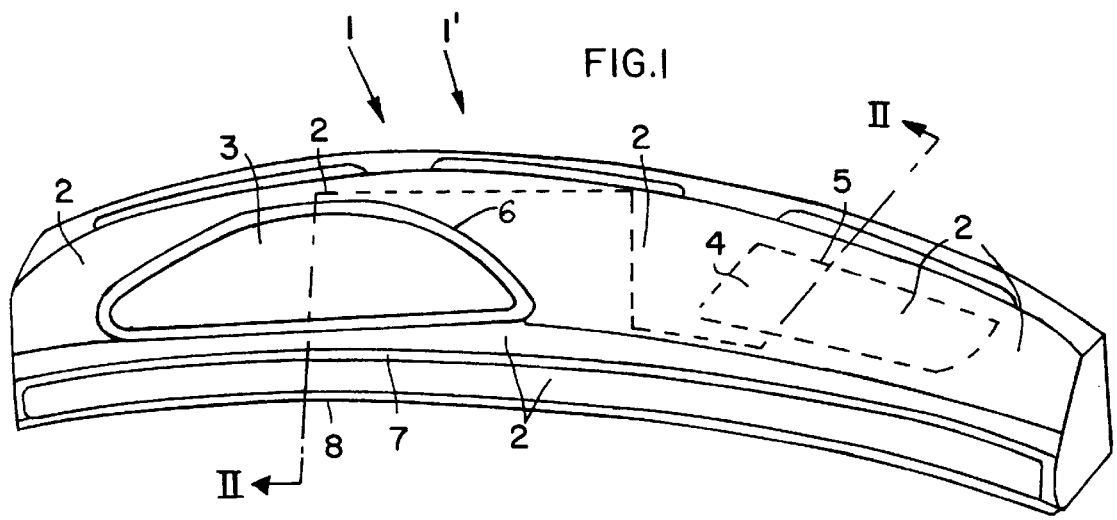
FIG. 1 is a schematic perspective view of a motor vehicle dashboard representing a trim component according to the invention.

FIG. 1 shows an automobile dashboard 1', generally representing an interior trim component 1 according to the invention. Such a dashboard 1', for a high quality standard, comprises decorative surfaces 2 that have a "soft-touch" or resilient surface feel. The dashboard 1' further includes functionally required configurations such as a protruding hood and cut-out for an instrument panel 3, and a break-away cover 4 for an airbag, which may be integrally formed or included in the decorative surfaces 2, but is defined by break-away score lines 5 for example. The dashboard 1' also includes edge rims 6 and various corners or other protruding edges 7 and 8, which may define the shape of the dashboard, but which may also include decorative trim features. To achieve a high quality standard for the dashboard, it is necessary that the edge rims 6, and the various corners and protruding edges 7 and 8 also have a soft-touch characteristic similar to that of the overall or general decorative surfaces 2. The sharply contoured or curved areas 6, 7 and 8 may, for example have a radius of curvature of only a few millimeters, such as less than 10 mm or less than 6 mm or even as small as 2 mm, when formed according to the method of the invention. Of course, it should be understood that less tightly curved areas, i.e. areas with a greater radius of curvature, can also be formed as desired.

Figure 2:
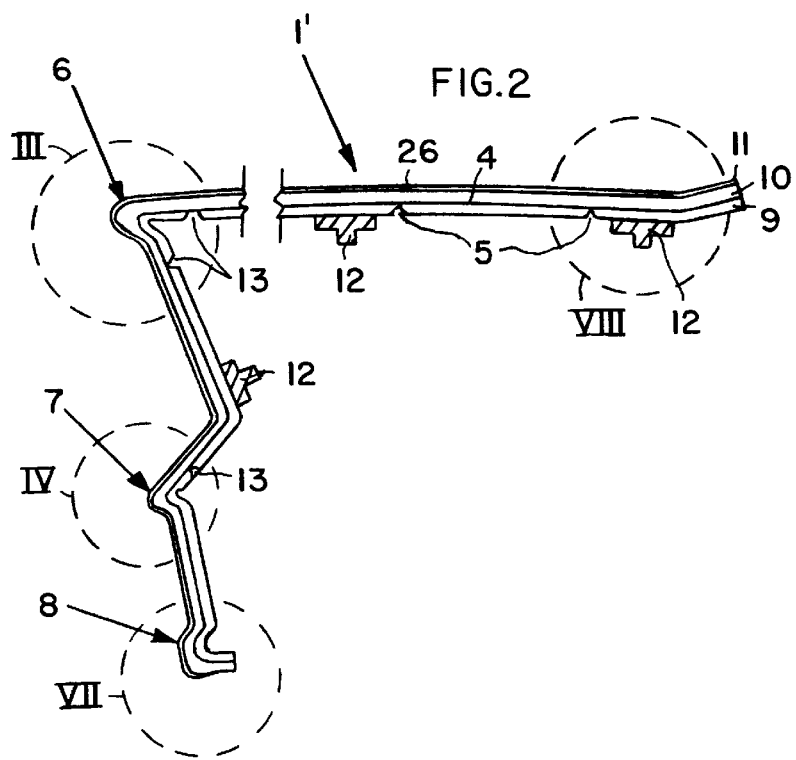
FIG. 2 is a schematic sectional view taken along the section line II—II passing through two different portions of 1Q the dashboard shown in FIG. 1.

FIG. 2 is a sectional view of the essential components of the dashboard of FIG. 1, on a larger scale. As can be seen, the dashboard 1' essentially comprises a three-layered laminated molded component including a substantially rigid and form-stable substrate 9, a soft elastic intermediate foam layer 10 which provides the soft-touch characteristic, and a decorative cover film 11. Furthermore, support frame components 12 such as an overall halo skeleton frame for supporting and strengthening the dashboard 1' as well as equipment mounting frame components are attached to the backside of the substrate 9. Such support frame components 12 provide supportive mounting locations on which various dashboard instruments, air ducts, air bag equipment, and the like are later mounted.

In addition to the break-away score line 5 for the air bag cover 4, score lines or crumple notch lines 13 may also be provided at various locations to achieve a desired energy absorption and crumpling of the dashboard in a crash or other impact situation. These break-away lines 5 and 13 are typically formed to extend through most or all of the thickness of the substrate 9, or even extending into the foam layer 10, preferably without showing any signs of the score lines from the decorative surface of the cover film 11.

The foam layer 10 and the decorative cover film 11 generally comprise a thermoplastic synthetic material, preferably a polyolefin polymer. The cover film 11 is preferably a solid polyolefin film, but may alternatively be a woven or non-woven fabric or fleece, a perforated film, a grained or embossed film, or a natural material such as leather. The foam layer is initially provided as a pre-fabricated uniform sheet of resilient soft foam that is compressible to the touch. Soft foam is an art-recognized designation of a class of foams distinguished from hard foam. The cover film and foam layer may be provided as a cover layer or cover sheet including both the film and the foam pre-laminated together. The substrate 9 is form-stable or substantially form-stable, meaning that it maintains the molded shape of the component but allows some flexibility. As a specific preferred example, the foam layer 10 is a polypropylene or polypropylene-polyethylene foam, while the cover film 11 comprises the same material. The substrate 9 preferably comprises the same thermoplastic polymer material, but more preferably further includes fibers of synthetic plastics, glass fibers, carbon fibers, and/or natural fibers. The most preferred material for the substrate 9 is either a single layer blend of polypropylene fibers plus natural plant fibers such as jute, sisal, flax, or kenaf fibers, or is a three-layered laminated substrate including polypropylene fibers and such natural fibers. These two types of preferred substrate materials are commercially available, respectively under the names "KenBoard™" and "LoPreFin™", from R+S Stanztechnik GmbH of Offenbach, Germany, or through their U.S. distributor. The preferred materials provide the advantage that they can all be easily and economically recycled.

FIGS. 3 and 4 show a dashboard with a similar configuration as the one shown in FIGS. 1 and 2, but according to the prior art. The prior art dashboard also comprises a form-stable substrate 9', a foam layer 10', and a decorative cover film 11', similarly is to the present inventive dashboard. However, in the prior art dashboard 1", the foam layer 10' has a reduced thickness and an increased density at the areas of any curved edges or corners 6' and 7', in comparison to the less sharply contoured decorative surface areas 2'. Moreover, the substrate 9' and the decorative cover film 11' may also be thinner in the more sharply curved areas 6' and 7' than in the surfacial areas 2'. This results from the prior art manufacturing methods, in which the substrate 9' and the cover film 11', and especially also the foam layer 10' are stretched and thus thinned-out over the sharply contoured areas 6' and 7'. The overall effect is that the finished dashboard 1" has a harder or less-resilient surface feel, i.e. the soft-touch characteristic is diminished or lost, at the sharply contoured areas 6' and 7' in comparison to the larger surface areas 2'.

FIGS. 5 and 6 generally correspond to the portions of a dashboard shown in FIGS. 3 and 4, but the dashboard 1' shown in FIGS. 5 and 6 has been manufactured according to the invention. In order to achieve the desired resiliency and soft-touch characteristic in all areas of the dashboard 1' including the large surface areas 2 and the sharply contoured areas 6 and 7, the foam layer 10 is not thinned or compressed in the areas of the sharply contoured corners or edges 6, 7 and 8 (see also FIG. 7). In fact, when manufactured according to the inventive method, the foam layer 10 has a region 10A at the sharply contoured areas 6, 7 and 8 in which the foam has been expanded to have a greater thickness and a reduced density in this area 10A in comparison to the rest of the foam layer 10 provided over the large surface areas 2. Preferably, the thickness of the foam material in the contoured areas 10A is about 5 to 30% greater, and the density is 5 to 30% less than that of the foam layer 10 over the large surface areas 2, and more preferably, the foam thickness in the areas 10A is 10 to 25% greater while the density is 10 to 25% lower than that in the other areas of the foam layer 10.

Furthermore, the respective thickness of the substrate 9 and of the cover film 11 are maintained more nearly constant over the sharply contoured areas 6, 7 and 8 relative to the large surface areas 2, than was achieved according to the prior art. The thickness of the substrate 9 and of the cover film 11 are understood to be substantially constant when most of the molding or forming was performed by laying the starting sheet materials onto the respective mold surfaces, and only the final molding of the sharply contoured or detail contoured areas was performed by stretching and thus thinning of the material during the molding process.

FIG. 8 shows an enlarged cross-section of an area of the upper portion of the dashboard 1' with a support frame component 12 such as an equipment mounting frame 12 bonded onto the backside of the substrate 9. The support frame component 12 is, for example, a mounting frame on which an airbag module will be mounted. For this purpose, the support frame component 12 comprises a rivet stud 12' made of thermoplastic, onto which the airbag module will be thermally riveted. The frame component 12 is preferably made of a polyolefin, such as polypropylene, so that it can be thermally fused to the substrate 9, without the use of any adhesives. Also shown in FIG. 8 is the break-away score line 5 for defining the break-away cover for the airbag. The score line 5 in the illustrated case penetrates completely through the substrate 9 and substantially or completely through the foam layer 10, so that only the cover film 11 remains as a continuous, uninterrupted layer, which is easily broken in the event the airbag is deployed.

The above described inventive dashboard is manufactured using an apparatus and method according to the invention, which will be described next in connection with various embodiments of the invention. In a first embodiment, FIG. 9 shows a first pre-molding station including a first positive or male mold 15, having vacuum passages 17 passing from the mold surface to a vacuum chamber 16. A vacuum is applied to the vacuum chamber 16 by connecting a vacuum port 18 to a vacuum pump or other vacuum source 52. A foam layer 10 and a cover film 11, or a pre-laminated cover sheet including the foam layer 10 laminated onto the cover film 11, is preheated in a heater such as a radiant oven, which is not shown. The preheated foam layer 10 and cover film 11 are then laid onto the male mold 15, with the foam toward the mold surface, and a vacuum is applied through the vacuum passages 17, in order to vacuum thermoform the hot sheet onto the surface of the mold 15. A clamping frame 19 can be used to seal the edges of the hot sheet against the vacuum. The hot sheet, i.e. the foam layer 10 and cover film 11 that have been pre-molded in this manner, is then allowed to cool to fix or set the pre-molded configuration. To accelerate the cooling, the mold 15 may be cooled by a cooling fluid flowing through cooling channels 14. Once it is cooled, the pre-molded foam and cover film form a semi-finished part 44, which is removed from the mold 15.

The pre-molded semi-finished part 44 is then laid into the lower female half-mold 22 in the lower tool 21 of the molding and laminating apparatus 20 shown in FIG. 10. The inner contour 25 of the lower female mold 22 corresponds to the outer contour 26 of the finished trim component such as a dashboard 1' that is to be manufactured. The semi-finished part 44 is laid into the mold 22 with the outer decorative surface of the cover film 11 in contact with the mold surface 25, and with the foam layer 10 facing upwardly. The apparatus 20 further includes an upper tool 23 including an upper male half mold 24. The upper mold 24 and lower mold 22 are relatively movable toward and away from one another in the direction of arrow C, by any known drive mechanism, which is not shown in the drawings.

The upper tool 23 further includes a clamping or sealing frame 27 that is vertically movably driven in the direction of arrows B by piston cylinder devices 28. As will be described below, the clamping frame 27 serves to form a vacuum seal around the edges of the component being manufactured. The upper tool 23 further includes a nesting die 29 that is movable in a diagonal direction shown by arrows A independently of the upper mold 24, by the linear drive 30. The nesting die 29 is necessary for carrying out the molding of any portion of the finished product that is undercut, negatively sloped, or substantially laterally molded relative to the main mold driving direction C. If the part being produced does not include such configured areas, then the nesting die 29 may be omitted.

The pre-molded foam and cover film 44 is held in place against the lower mold 22 by means of a vacuum applied thereto. For this purpose vacuum passages 31, such as bored holes, are provided extending from the inner female contour 25 through the body of the lower mold 22, and into a vacuum chamber 32 formed within a vacuum plenum 33. A vacuum source 52 is connected to a vacuum port 34, so as to create a vacuum and draw air along the arrows D and E. In addition to the vacuum passages 31, which are generally distributed over the entire molding surface 25, additional vacuum passages 35 are provided in the lower mold 22 particularly at the more sharply contoured areas such as the edge rim 6 and corner edges 7 and 8. These more sharply contoured areas require additional vacuum to be more finely applied. Thus, in the illustrated example embodiment, two rows of additional vacuum passages 35 are provided extending in parallel along each of the protruding edges 6, 7 and 8.

The upper mold 24 comprises protruding mold lips or ribs 36, 37 and 38 for forming the substrate 9 into the shape of the contoured edge areas 6, 7 and 8 respectively. The mold surface of the upper mold 24 further includes protruding knife edges 39 and 40 for pressing or cutting the break-away score lines 5 and 13 in the substrate 9. Moreover, recesses 43 are provided in the surface of the upper mold 24, for receiving the support frame components 12, which are simply placed or clipped into the recesses 43 at the beginning of a molding cycle, while the apparatus 20 is open. The support frame components 12 and the recesses 43 are so configured and arranged that the bonding surfaces of the components 12 to be bonded onto the substrate 9 lie flush with the remaining mold surface of the upper mold 24.

Once the support frame components 12 have been placed in the recesses 43, and the pre-formed part 44 has been placed and vacuum-held into the lower mold 22, then a heating device such as a hot air blower 41 is moved into position adjacent the upper mold 24. Hot air is delivered into the hot air blower 41 as shown by arrow F. The hot air blower 41 includes hot air nozzles 42 respectively directed at the support frame components 12, whereby hot air at approximately 450 to 500° C. is blown against the thermoplastic material support frame components 12 so as to heat and soften the thermoplastic material on the bonding surface of each of the components 12. As soon as the bonding surface of each support frame component 12 has been sufficiently heated and softened to carry out a thermal weld bonding onto the substrate 9 as will be described below, the hot air blower device 41 is retracted out of the molding apparatus 20.

Then, a substrate material sheet 9, which has been preheated to about 180 to 200° C. in a radiant oven (not shown) and preferably pre-compressed to a thickness of about 2.5 mm for example, is moved into a position between the upper mold 24 and the lower mold 22 as shown in FIG. 11. Next, as understood from the transition from FIG. 11 to FIG. 12, the upper mold 24 is driven downward to push the hot substrate sheet 9 progressively down into the lower mold 22 and finally against the back surface 45 of the foam layer 10 of the pre-formed part held in the lower mold 22. The heat of the hot substrate layer 9 together with the molding pressure applied by the upper mold 24 cause the polyolefin material of the support frame components 12 and of the foam layer 10 respectively to thermally fuse and bond with the polyolefin material of the substrate 9.

As the upper mold 24 moves down into the lower mold 22, the piston cylinder drives 28 move the clamping or sealing frame 27 downward in the direction of arrows B, so as to clampingly hold and form a vacuum seal of the substrate 9, foam layer 10, and cover film 11 against an upper clamping or sealing surface of the lower mold 22, around the perimeter of the part being laminated. Once the upper mold 24 reaches its lowermost end position, the piston cylinder device 30 is activated to drive the nesting die 29 outward in a diagonal direction A to mold and laminate the portion of the trim component in the area of the sharply contoured edges 7 and 8.

Figure 12:
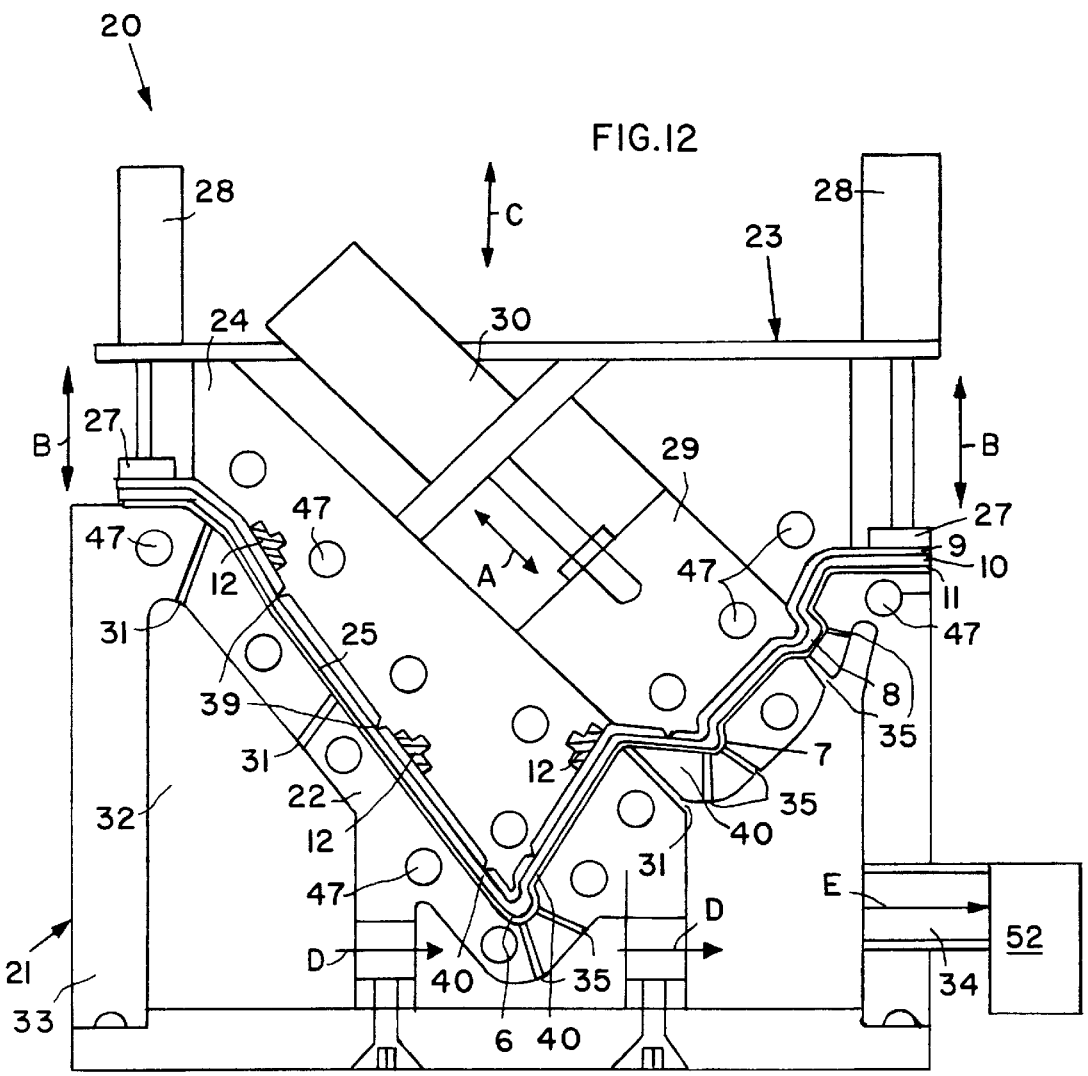
FIG. 12 is a sectional view showing the apparatus of FIG. 10 in a further subsequent mold-closing step.

During the molding process as shown in FIG. 12, a vacuum is applied or increased in the vacuum chamber 32 of the vacuum plenum housing 33 so that the pre-molded part 44 and especially the cover film 11 is tightly held against the mold surface contour 25 of the lower mold 22. Particularly, the cover film 11 is tightly pulled into the sharply contoured areas 6, 7 and 8 of the female mold contour 25 by means of the additional vacuum passages 35. The heat of the hot substrate layer 9 permeates into and through the foam layer 10 and cover film 11, so that these two layers 10 become somewhat pliable and moldable once again, so that it is assured that the pre-molded part 44 is now finally vacuum molded to the exact desired finished contour as defined by the mold contour 25 of the lower mold 22, in all areas including the sharply contoured areas 6, 7 and 8. Simultaneously, the hot moldable substrate layer 9 is molded to the contoured shape of the male mold contour 46 of the upper mold 24. Through this molding process it may occur that the substrate is stretched and thinned to a lesser thickness in the sharply contoured areas 6, 7 and 8 as it is molded over the protruding lips or ribs 36, 37 and 38. Similarly, if any further molding or stretching of the cover film 11 takes place, the cover film 11 may also be slightly thinner in the sharply contoured areas 6, 7 and 8. As a result, a greater tolerance or larger space remains between the substrate 9 and the cover film 11, which space needs to be filled out by the foam layer 10, since the substrate 9 is firmly held against the mold surface 46 of the upper mold 24 and the cover film 11 is firmly held against the mold surface 25 of the lower mold 22. This arrangement is shown on an enlarged scale in the schematic view of FIG. 13.

Figure 13:
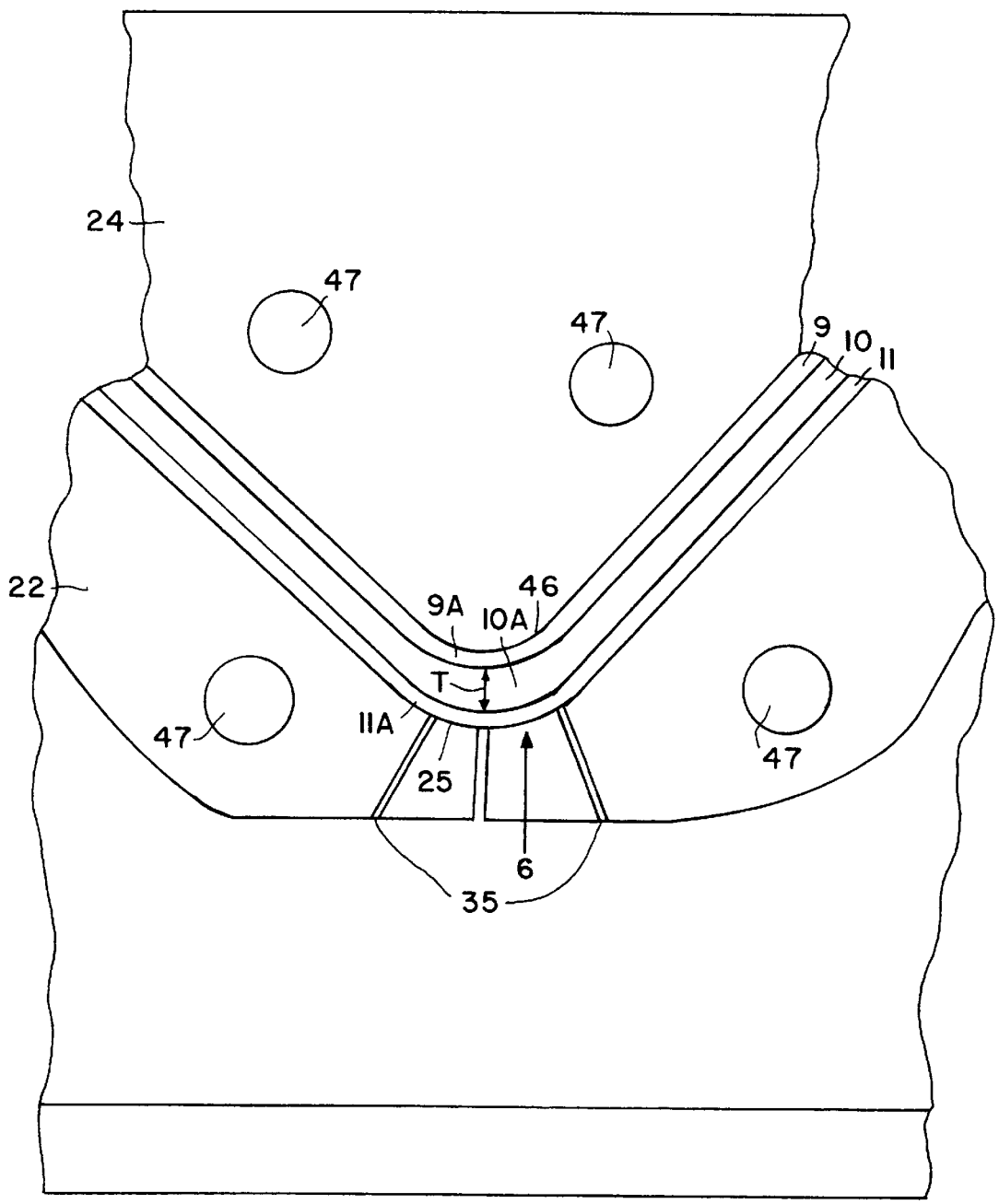
FIG. 13 schematically shows an enlarged cross-section through the molding apparatus of FIG. 12 at the sharply contoured area 6 during a molding step.

FIG. 13 shows the increased tolerance or thickness T between the thinned substrate 9A and the thinned cover film 11A in the area of the sharply contoured edge rim 6. This increased tolerance T can also be caused by appropriately forming the mold surface 46 of the upper mold 24 and the mold surface 25 of the lower mold 22, i. e. by providing a greater clearance thickness between the two molds in the sharply contoured areas such as the edge rim 6. Since the substrate 9 and cover film 11 are positively held against the mold surfaces, the increased tolerance T is positively formed and a vacuum is either positively introduced into or effectively caused in the space of this increased tolerance T. As soon as the heat of the hot substrate sheet 9 heats up the foam layer 10 to its softening temperature, the foam layer 10 undergoes an expansion under the influence of the vacuum to fill out the increased tolerance area T. Moreover, upon heating, the gas contained in the cells of the foam expands and positively drives the expansion of the foam layer 10. The foam layer may even include a blowing agent in its composition, which positively triggers a blowing expansion upon reaching a certain threshold temperature, such as 190° C. or 200° C. or 220° C. The degree of expansion is shown exaggerated in FIG. 13, but typically is in the range of 10 to 30%, but may be up to about 50%. As a result, the density of the foam in the expanded tolerance area T is correspondingly reduced.

Once the forming and lamination step shown in FIG. 12 has been completed, the now integrally laminated and formed part is allowed to cool, which can be facilitated by providing cooling channels 47 in both the upper mold 24 and the lower mold 22, for flowing a cooling fluid or the like therethrough. Once the laminated part has cooled to a temperature below the softening or setting temperature of the materials, the molding apparatus 20 is opened, and the molded component is removed therefrom and retains its molded shape in a form-stable manner. Correspondingly, the expanded nature of the foam in the sharply contoured areas 6, 7 and 8 is firmly set and retained in the finished product.

For some configurations of the trim component to be manufactured, the molding and lamination process described above with reference to FIGS. 11 and 12 may not achieve the best possible results. Namely, for some component configurations, as the flat substrate sheet 9 is pushed down by the upper mold 24 to be laminated against the foam layer 10, the substrate sheet 9 is pulled with friction along the foam layer 10 before reaching its final laminated position. In that case, the foam layer 10 or even the cover film 11 may become wrinkled or deformed. A second embodiment of the inventive method and apparatus for overcoming this problem will now be described in connection with FIGS. 14 to 16. The second embodiment provides a step of pre-molding or pre-forming the substrate sheet 9 by itself onto the upper mold 24', before laminating the pre-formed substrate 9 with the pre-formed foam layer and cover film 44. To achieve this, the apparatus of FIGS. 14 to 16 substantially corresponds to that described above, with the following additional features.

The holding or clamping frame 27 is now provided as a bi-directionally movable clamping frame that clampingly holds the substrate sheet 9 from above and from below. Namely, an upper clamping frame 27A is supported and driven in the vertical direction B by upper piston cylinder devices 28A, while a cooperating lower clamping frame 27B is supported and driven in the vertical direction B' by lower piston cylinder devices 28B.

The upper and lower clamping frames 27A and 27B serve to hold and move the substrate sheet 9 relative to the upper mold 24', while an additional vacuum sealing frame 27C clamps and seals the perimeter of the foam layer 10 and cover film 11 onto the lower mold 22 in order to seal off the vacuum provided through the lower mold. The seal fame 27C may be arranged on pivotable tilt arms that swing in from the sides, or may be a weighted frame that simply bears down and provides a seal by its own weight.

Furthermore, the upper mold 24' in this second embodiment is also provided with a hollow vacuum chamber 50 therein, which communicates with the mold surface through additional vacuum passages 31 extending through the body of the upper mold 24', and which is connected to a vacuum source 52 at a vacuum port 51. Thus, a vacuum is created in the chamber 50 by sucking air out through vacuum port 51 as shown by arrow I. For simplicity a nesting die is not shown in the embodiment of FIGS. 14 to 16.

Figure 14:
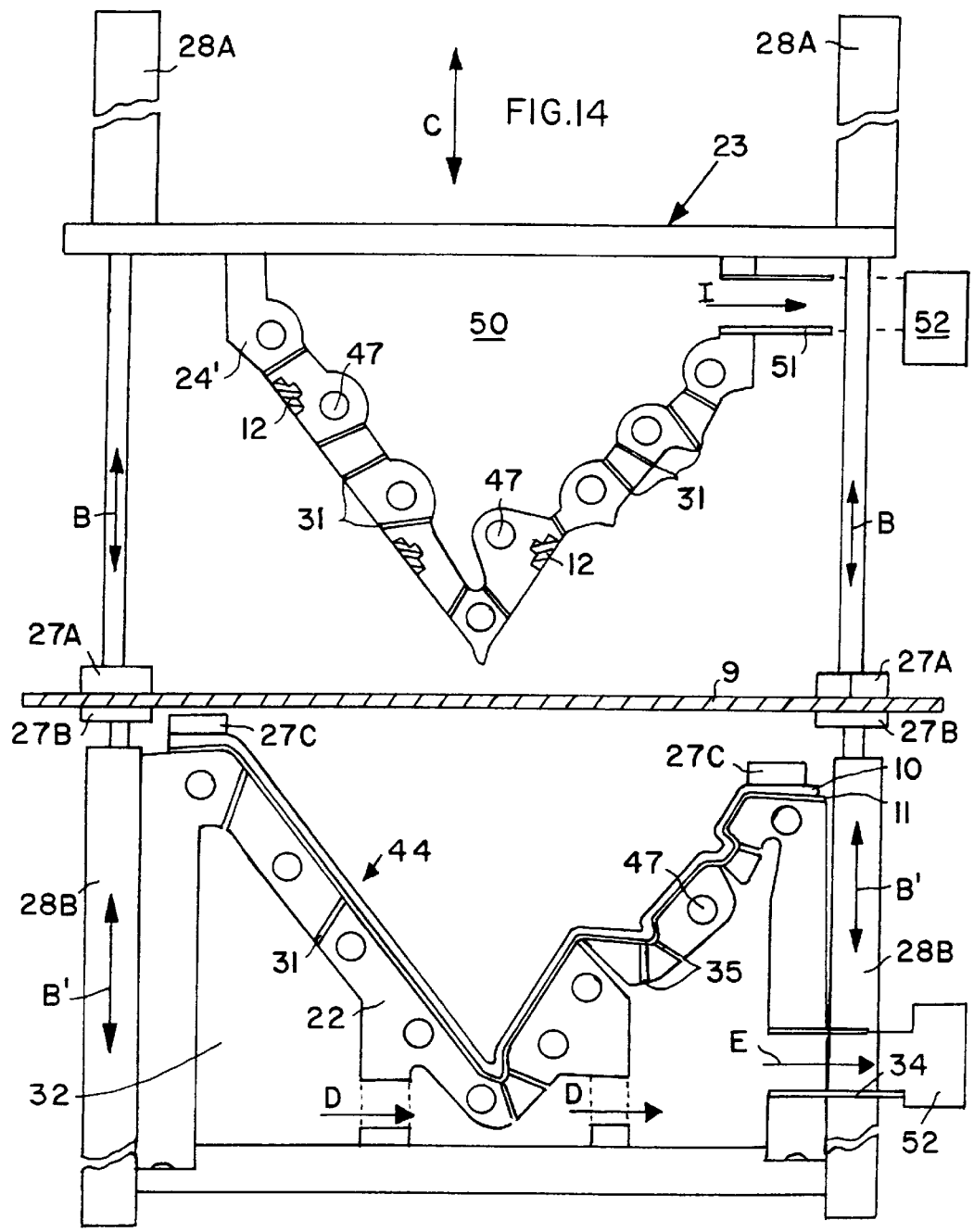
FIG. 14 is a schematic sectional view of a second embodiment of a molding apparatus for pre-molding the substrate sheet and carrying out the final lamination and molding according to the invention.
Figure 15:
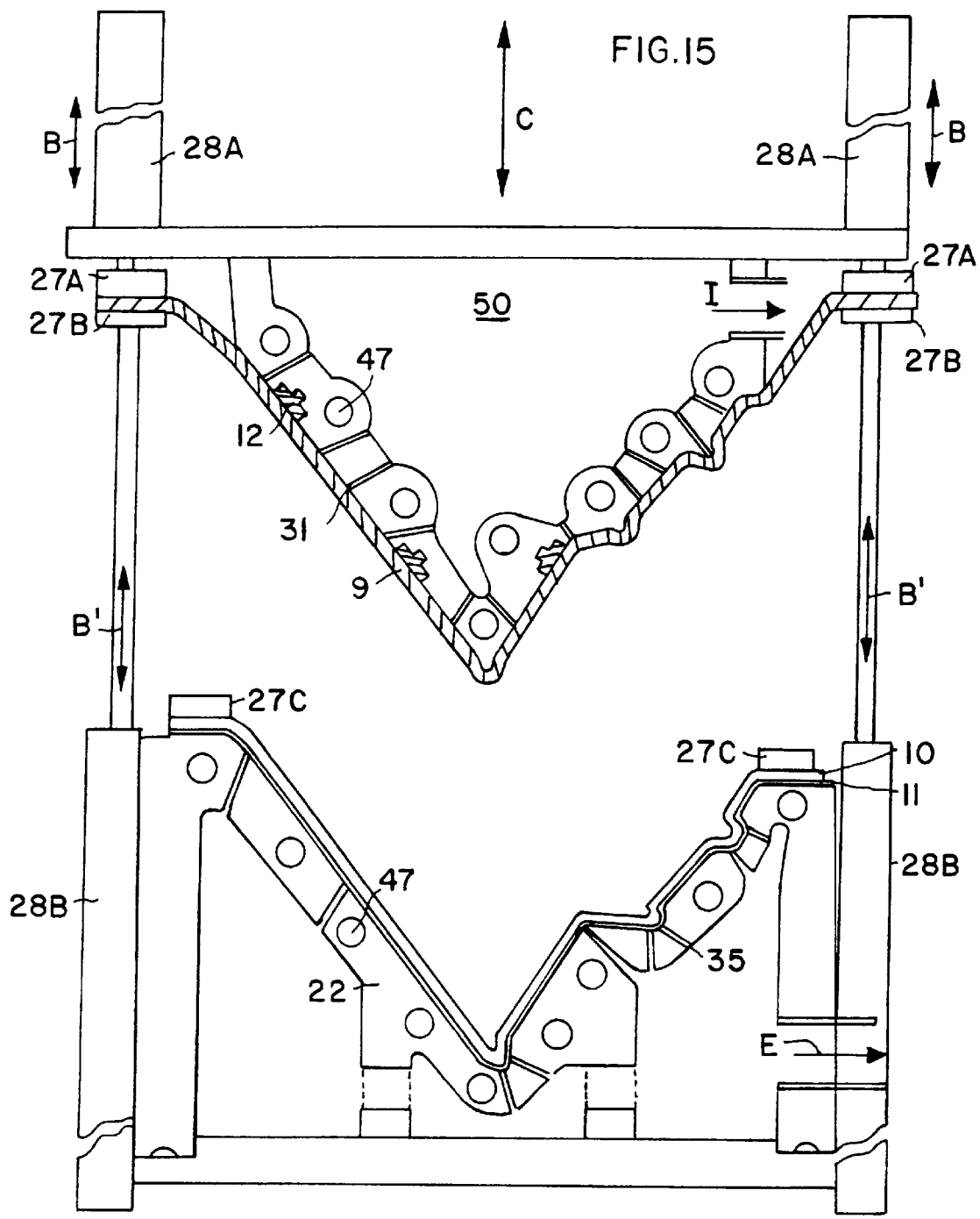
FIG. 15 is a sectional view of the apparatus of FIG. 14 in a subsequent operation step.
Figure 16:
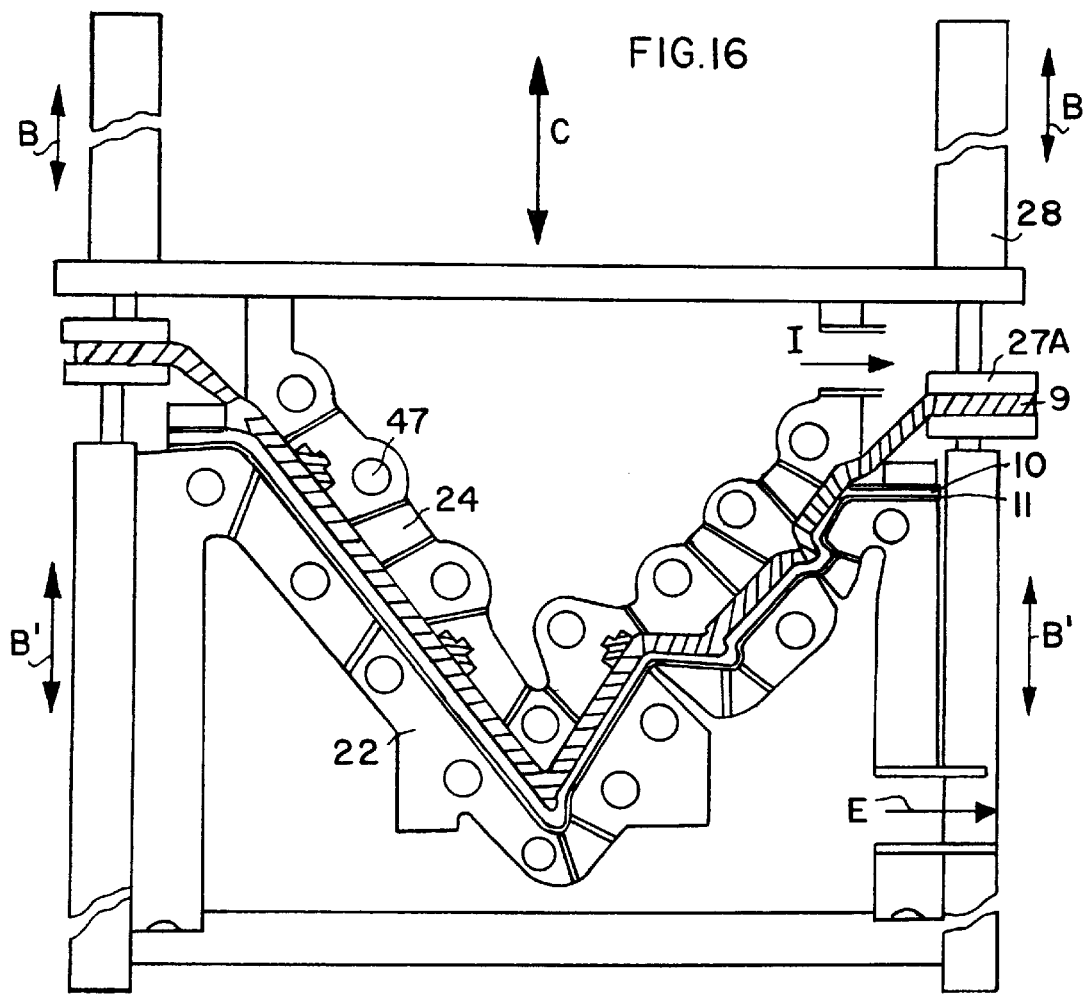
FIG. 16 is a sectional view of the apparatus of FIG. 14 in the further subsequent mold-closing step.

The present second embodiment of the method is carried out the same as the above described method up to the work step of FIG. 11. Namely, the foam layer 10 and cover film 11 are pre-formed, cooled, and then laid into the lower mold 22. The support frame components 12 are set into the upper mold 24' and are heated for example by a hot air blower, and then the pre-heated substrate 9 is moved into position as shown in FIG. 14. Then as shown in FIG. 15, the piston cylinder devices 28A and 28B in unison move the clamping frames 27A and 27B upward, holding the substrate sheet 9 therebetween, so as to pull the substrate sheet 9 over the molding surface of the upper mold 24'. A vacuum is applied to the vacuum chamber 50 so as to vacuum form the hot substrate sheet 9 closely and positively onto the mold surface of the upper mold 24'. The up and down motion of the clamping frame cylinders 28A and 28B can be easily controlled by regulating the relative air pressure provided to the respective pneumatic cylinders. Furthermore, the clamping force applied between the clamping frames 27A and 27B onto the substrate sheet 9 can also be controlled, to allow a controlled slipping of the substrate sheet 9 while it is being formed or vacuum molded onto the upper mold 24. Simultaneously with this pre-molding of the substrate 9, or directly thereafter, the upper mold 24' is moved downward in the direction of arrow C, so as to bring the still-hot pre-molded substrate 9 into laminating contact with the pre-molded foam layer 10 and cover film 11, as shown in the transition from FIG. 15 to FIG. 16.

Just as in the first method embodiment described above, the hot substrate 9 is heat bonded onto the support frame members 12 and onto the foam layer 10, and the foam layer 10 softens and expands under the effect of the heat coming from the substrate 9 and the vacuum being applied through the upper mold 24' and the lower mold 22. The only difference from the above described first method embodiment, is that the substrate 9 has been pre-molded so that it cannot disrupt or deform the pre-molded foam layer 10 or cover film 11 during the final lamination process, and additionally a vacuum is applied through the upper mold 24'. Thereby, any air pockets that may be formed between the substrate 9 and the foam layer 10 during the lamination are sucked out by the vacuum effective through the air-permeable substrate 9.

Once the lamination is completed, the upper mold 24' is again retracted, and the molded laminated component is cooled and removed from the mold. Just as in the first embodiment described above, the finished product has a foam layer 10 with an increased thickness and a reduced density at the sharply contoured areas 6, 7 and 8 relative to the flat surface areas 2. Thus, the soft-touch feel and the impact absorbing properties are maintained or even enhanced at the protruding edges and corners of the finished product.

In an alternative embodiment of the invention, the pre-molding and final molding and lamination steps can be carried out in a single molding station or apparatus including one set of a positive mold member and a negative mold member, as will now be described in connection with FIGS. 17 and 18.

In this embodiment, the foam layer 10 such as a polypropylene foam layer 10 and the decorative cover film 11 are pre-molded or pre-formed in a female negative mold member. To avoid damaging or blemishing the outer surface of the cover film 11, which will be in contact with the negative mold surface, the pre-laminate of the foam layer 10 and the cover film 11 is heated only from the foam side. For example, the pre-laminate is held by a carrier frame, and the foam layer 10 is directly heated by a radiant heater or a hot air heater for a short time to a temperature of about 170° C., while the cover film 11 is cooled or held at a stabilized temperature of about 100° C. or less by a cooling air flow or by contact with a cooling plate (e.g. a liquid cooled metal plate). Once the pre-laminate of foam layer 10 and cover film 11 has been pre-heated in this manner (not shown), it is then introduced into the molding station.

Figure 17:
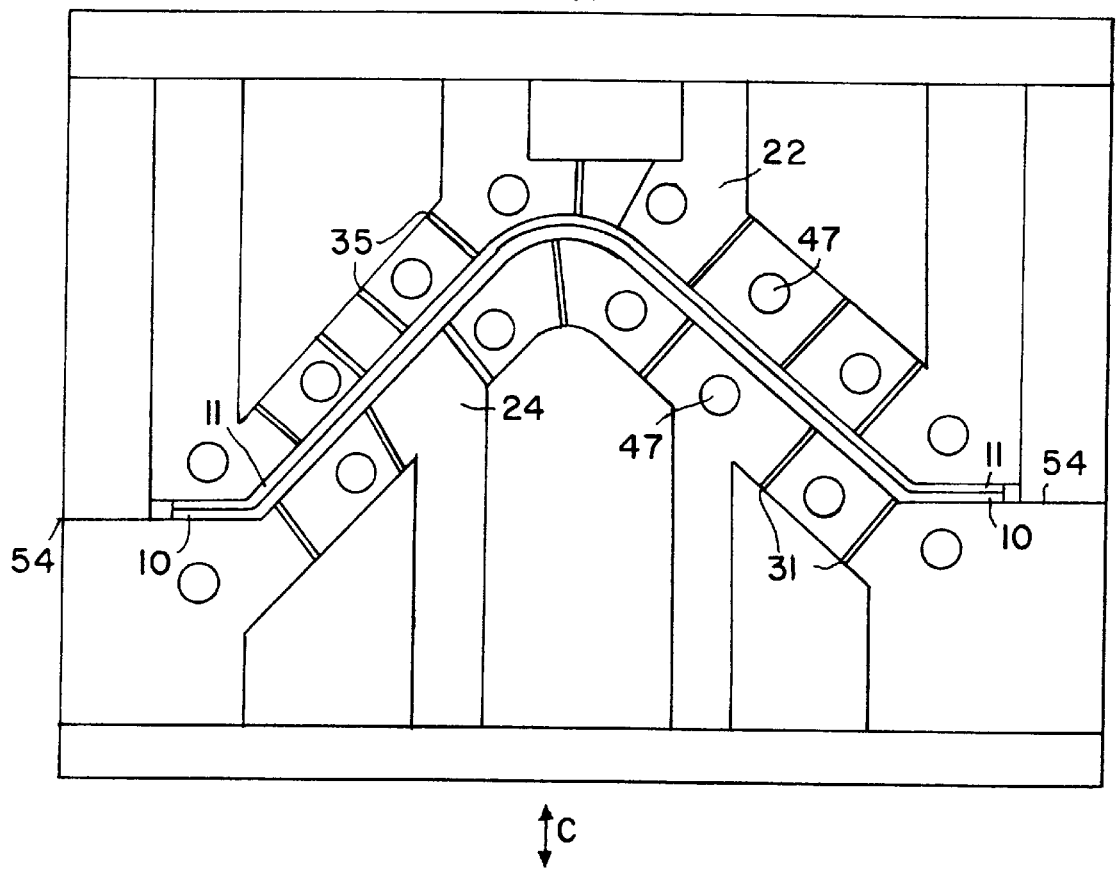
FIG. 17 is a schematic sectional view of a further embodiment of a molding apparatus for carrying out the pre-molding and final molding in one molding station according to the invention, shown in a stage of pre-molding the foam layer and the cover film.

As shown in FIG. 17, the positive male mold member 24 has pressed the pre-heated foam layer 10 and the decorative cover film 11 into the negative mold member 22. In this embodiment, the negative mold member 22 may conveniently be the upper mold member, while the positive mold member 24 is the lower mold member. The negative mold member 22 is cooled by water flowing in passages 47, so as to further cool, protect and stabilize the cover film 11. The cover film 11 is pressed into the negative mold member 22 with a low pressure and fixed or held in place by a vacuum applied through vacuum passages 35. The spacing distance between the two mold members is mechanically fixed and maintained by a stop abutment 54, to be equal to the total thickness of the foam layer 10 and the cover film 11. In this manner, crushing, blemishing, and other damage to the cover film 11 and the foam layer 10 is positively avoided. The cooling 47 of the negative mold member 22 serves to stabilize and set the pre-molded shape of the foam layer 10 and cover film 11, which are further held in place by the vacuum applied through passages 35. Then, the positive mold member 24 is retracted, while the foam layer 10 and the cover film 11 remain in place in the negative mold member 22.

Next, the substrate 9 is pre-heated and placed onto the positive mold member 24, in any manner described herein. For example, this may involve pre-molding of the substrate 9 onto the positive mold member 24 using vacuum and a carrier frame 27 as described in connection with FIGS. 15 and 16.

As shown in FIG. 18, the positive mold member 24 then pushes the hot substrate 9 against the foam layer 10, which is held together with the cover film 11 in the negative mold member 22. The spacing distance between the two mold members is mechanically fixed and maintained by the stop abutment 54, whereby the spacing distance has been increased by the thickness of the substrate 9 by placing a shim member 55 between the abutting surfaces of the stop abutment.

In this embodiment of FIGS. 17 and 18, all the pre-molding and final molding and laminating steps may be carried out in a single molding station or apparatus, whereby a lower capital investment in equipment, and fewer handling steps during the process, are required as compared to the other embodiments of the invention. Also, the arrangement of the negative mold as the upper mold member and the positive mold as the lower mold member allows more convenient handling of the materials during the process. All other features of the invention also apply to the present embodiment even though they have not been expressly shown in FIGS. 17 and 18 or described again in detail.

It should further be understood that the invention is not limited to the example embodiments that have been illustrated and concretely described above. Instead, any type of interior trim component or molded structural panel other than dashboards can also be manufactured according to the invention. For example, the present invention also applies to all other vehicle interior trim components such as door panels and the like, molded furniture components, or other structural components for which a soft-touch characteristic is desired. Various modifications are possible within the scope of the inventive method and apparatus. For example, it would be possible to manufacture a trim component without the decorative cover film 11, whereby the outer surface of the foam layer 10 becomes the visible or exposed surface. Alternatively, it is possible to form a trim component with more than three layers, whereby in any event it is possible to achieve a finished product with a foam layer thickness that is increased and a foam layer density that is reduced at sharply contoured areas of the finished product. The method can be varied by pre-molding the foam layer and cover film into a female negative mold rather than onto a male positive mold, as has already been mentioned above.

As a further alternative, the substrate may first be pre-molded in a separate molding station, for example, into a female mold, from which it is removed and then placed into the laminating mold together with the pre-molded foam layer and cover film. A turn-table or shuttle may be used to transfer the pre-molded parts from the pre-molding stations to the final lamination station. The key requirement in any event is to carry out the steps in sufficiently rapid succession, i.e. with a minimum transfer time, so that the hot substrate material does not cool down below a temperature at which thermal bonding in the final lamination process can be achieved. The preferred methods concretely described above are deemed to achieve the most efficient and quickest total cycle time, with the minimum number of work steps and with the minimum transfer time and lost heat.

With any of the above methods and apparatus, the achieved result is a trim component such as a vehicle dashboard with an adequate soft-touch characteristic on all surfaces, and especially in the sharply curved or contoured areas such as protruding edges and corners. This is achieved by the expansion of the foam layer in these areas to fill out an enlarged space or tolerance between the substrate and the cover film, under the effect of the laminating heat and/or the applied vacuum. If desired, the thickness may be increased and the density may be decreased in the foam layer in other areas, i.e. not only at the sharply contoured areas, by providing the desired tolerance space which the expanding foam must fill. For example, the upper mold may be retracted or pulled back by a slight distance once the lamination and heat expanding of the foam has begun. This can also be achieved only at particular desired areas by providing an independently movable nesting die at such areas.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A trim component contoured in at least two dimensions, comprising a form-stable substrate, a cover film, and a foam layer between said substrate and said cover film, wherein said trim component includes a relatively less contoured surfacial area and a relatively more contoured curved area, and wherein said foam layer has a reduced density at said curved area relative to said surfacial area.

2. The trim component of claim 1, wherein said foam layer is thermal fusion bonded onto said substrate, and wherein said substrate, said foam layer and said cover film are laminated together.

3. The trim component of claim 2, not including polyurethane foam, and not including an adhesive between said substrate and said foam layer.

4. The trim component of claim 1, wherein said foam layer further has an increased thickness at said curved area.

5. The trim component of claim 4, wherein said increased thickness of said foam layer at said curved area is in the range from 10% to 30% greater than a lesser thickness of said foam layer at said surfacial area.

6. The trim component of claim 1, wherein said reduced density of said foam layer at said curved area is in the range from 10% to 30% less than a greater density of said foam layer at said surfacial area.

7. The trim component of claim 1, wherein said substrate comprises a first polyolefin material, said foam layer comprises a second polyolefin material, and said cover film comprises a third polyolefin material.

8. The trim component of claim 7, wherein said first, second and third polyolefin materials are all the same polyolefin.

9. The trim component of claim 1, wherein said substrate, said foam layer and said cover film all comprise polypropylene.

10. The trim component of claim 1, wherein said substrate comprises natural plant fibers and polypropylene, said foam layer comprises at least one of polypropylene and polyethylene, and said cover film comprises at least one of polypropylene and polyethylene.

11. The trim component of claim 1, wherein said trim component is a motor vehicle dashboard having a soft-touch surface resilience provided by elastic yielding of said foam layer, wherein said soft-touch surface resilience is not less at said curved area than at said surfacial area.

12. The trim component of claim 1, wherein said curved area comprises at least one of a protruding rim, a curved corner, a curved edge, and a decorative raised bead.

13. The trim component of claim 12, wherein said curved area has a radius of curvature of less than 10 mm.

14. The trim component of claim 14, wherein said curved area has a radius of curvature of less than 6 mm.

15. The trim component of claim 1, further comprising a support frame component, essentially consisting of a thermoplastic material, that is thermal fusion bonded onto a surface of said substrate opposite said foam layer, and that is adapted to stiffen and support said trim component or to mount an auxiliary component on said trim component.

16. The trim component of claim 1, wherein said substrate has a notch groove forming a break-away score line on a surface thereof opposite said foam layer, and wherein said trim component is adapted to crumple or break away along said break-away score line in the event of an impact force being applied to said trim component.

17. The trim component of claim 1, comprising a plurality of separately molded trim component parts, wherein said parts are thermal fusion bonded together to form said trim component.

18. A method of making the trim component of claim 1, said method comprising the following steps:
   a) heating a first sheet comprising said foam layer and said cover film;
   b) pre-molding said heated first sheet into a configuration that is contoured in at least two dimensions, and then cooling said pre-molded first sheet;
   c) supporting said pre-molded first sheet on a negative final mold member, with said cover film in contact with a negative mold surface of said negative final mold member;
   d) heating a second sheet comprising a substrate material;
   e) laminating said heated second sheet onto said pre-molded first sheet supported on said negative final mold member by pushing said heated second sheet against said foam layer of said pre-molded first sheet using a positive final mold member, to form a molded laminated product; and
   f) cooling said molded laminated product so that substrate material forms said form-stable substrate.

19. The method of claim 18, wherein said pre-molding of said heated first sheet comprises vacuum molding said heated first sheet onto a positive pre-mold member with said foam layer in contact with a positive mold surface of said positive pre-mold member, and further comprising a step of transferring said pre-molded first sheet from said positive pre-mold member to said negative final mold member.

20. The method of claim 19, wherein said pre-molding of said heated first sheet comprises laying said heated first sheet onto said positive pre-mold member to form relatively gross contours and using said vacuum molding only to form relatively fine detail contours.

21. The method of claim 18, wherein said pre-molding of said heated first sheet is carried out on said negative final mold member with said cover film in contact with said negative mold surface, wherein said pre-molded first sheet is and remains supported on said negative final mold member throughout said steps b), c), d) and e), wherein said heating of said first sheet is carried out from a side of said first sheet having said foam layer, and further comprising cooling said negative final mold member.

22. The method of claim 18, wherein said step of supporting said pre-molded first sheet on said negative final mold member comprises applying a vacuum to hold said cover film positively and closely in contact with said negative mold surface at said relatively less contoured surfacial area and at said relatively more contoured curved area.

23. The method of claim 22, wherein said laminating is carried out such that a spacing distance between a surface of said second sheet facing said foam layer and a surface of said cover film facing said foam layer is greater at said relatively more contoured curved area and is less at said relatively less contoured surfacial area, due to thinning of at least one of said second sheet or said cover film, or due to provision of a greater mold gap spacing between a positive mold surface of said positive final mold member and said negative mold surface of said negative final mold member at said relatively more contoured curved area in comparison to said relatively less contoured surfacial area.

24. The method of claim 23, further comprising expanding said foam layer at said relatively more contoured curved area during said step of laminating said heated second sheet onto said pre-molded first sheet, so that said foam layer fills out said greater spacing distance.

25. The method of claim 18, wherein said laminating step further comprises expanding said foam layer to have an increased thickness and said reduced density at said relatively more contoured curved area, and wherein said expanding step comprises heating said foam layer using heat provided to said foam layer from said heated second sheet such that said heating of said foam layer causes or contributes to an expansion of said foam layer.

26. The method of claim 25, wherein said expanding step further comprises applying a vacuum to at least one of said first sheet and said second sheet such that said vacuum contributes to said expansion of said foam layer.

27. The method of claim 18, wherein said step of laminating said heated second sheet onto said pre-molded first sheet commences with said heated second sheet in a flat non-contoured shape, and comprises molding said heated second sheet simultaneously with said laminating of said heated second sheet onto said pre-molded first sheet.

28. The method of claim 18, further comprising a step of pre-molding said heated second sheet between said steps d) and e), such that said heated second sheet laminated onto said pre-molded first sheet in said step e) has already been pre-molded.

29. The method of claim 28, wherein said step of pre-molding said heated second sheet comprises vacuum forming said heated second sheet onto said positive final mold member.

30. The method of claim 28, wherein said step e) is carried out directly subsequent to said step of pre-molding said heated second sheet such that said heated second sheet is still at a temperature of at least 180° C. upon commencing said step e) without reheating said heated second sheet.

31. The method of claim 18, wherein said substrate material of said second sheet is air permeable, and further comprising applying a vacuum to said second sheet through said positive final mold member during said step e).

32. The method of claim 18, wherein said substrate material comprises polypropylene and natural plant fibers, said foam layer comprises at least one of polypropylene and polyethylene, and said cover film comprises at least one of polypropylene and polyethylene, and wherein said step e) comprises thermal fusion bonding of said substrate material with said foam layer using heat provided by said heated second sheet.

33. The method of claim 18, wherein said foam layer is a pre-fabricated soft resilient foam sheet originally having a uniform density and a uniform thickness, and wherein said method does not include a back-foaming step and wherein said method does not include a foam injection step.

34. The method of claim 18, wherein said foam layer includes a a blowing agent that triggers an expansion of said foam layer at a temperature exceeding a threshold temperature in the range of 180° C. to 220° C., and wherein said step e) comprises heating said foam layer to greater than said threshold temperature using heat from said heated second sheet.

35. The method of claim 18, further comprising fixing a thermoplastic material support frame component on said positive final mold member and heating at least a surface of said support frame component to at least a softening temperature of said thermoplastic material before said step e), and then thermal fusion bonding said support frame component onto a back surface of said heated second sheet facing away from said pre-molded first sheet during said step e).

36. A method of manufacturing the trim component of claim 1, comprising heat laminating a previously produced sheet comprising said soft foam layer onto said substrate, between said substrate and said cover film, and expanding said soft foam layer to a differing extent respectively in said relatively less contoured surfacial area and said relatively more contoured surfacial area so as to fill out differing spacing distances between said substrate and said cover film in said respective surfacial areas.

37. The method of claim 36, wherein said expanding of said soft foam layer comprises heating said foam layer to a temperature sufficient for a soft foam material of said soft foam layer to soften and expand.

38. The method of claim 37, wherein said expanding of said soft foam layer further comprises applying a vacuum to said soft foam layer.

* * * * *